Jan. 3, 1939.　　　　G. B. BENTZ　　　　2,142,263
BATHTUB SEAT ATTACHMENT
Filed Aug. 12, 1937　　　4 Sheets-Sheet 1
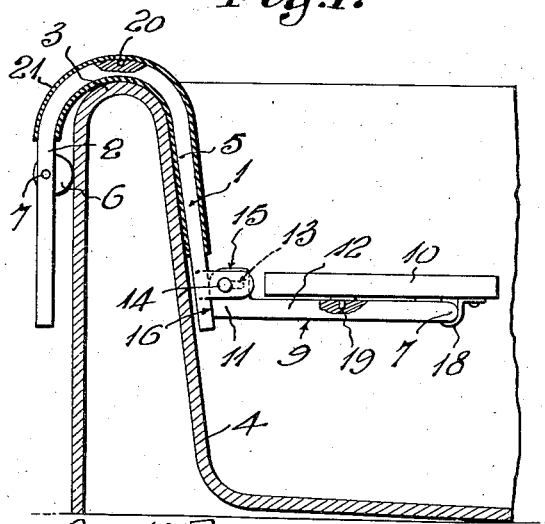
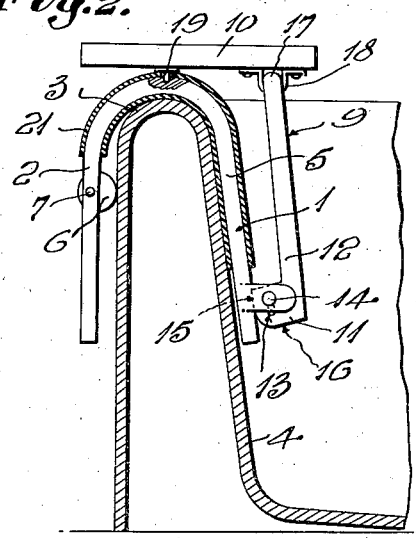
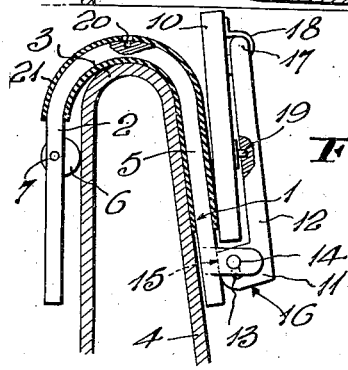
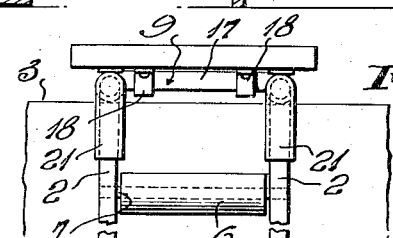
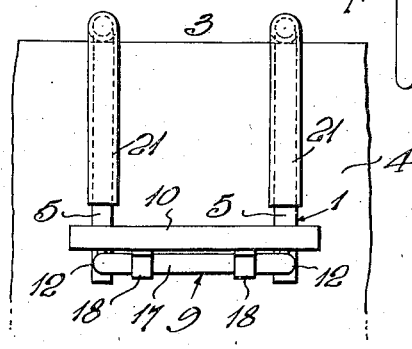
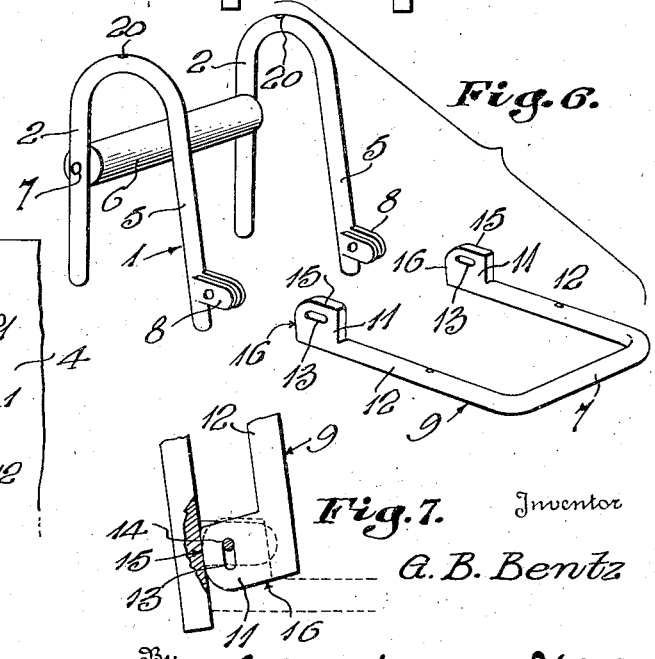
Inventor
G. B. Bentz
By H. O. Willson &co.
Attorneys Jan. 3, 1939.   G. B. BENTZ   2,142,263
BATHTUB SEAT ATTACHMENT
Filed Aug. 12, 1937   4 Sheets-Sheet 2
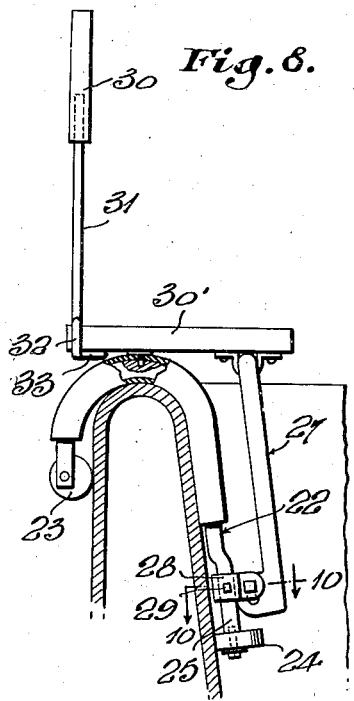
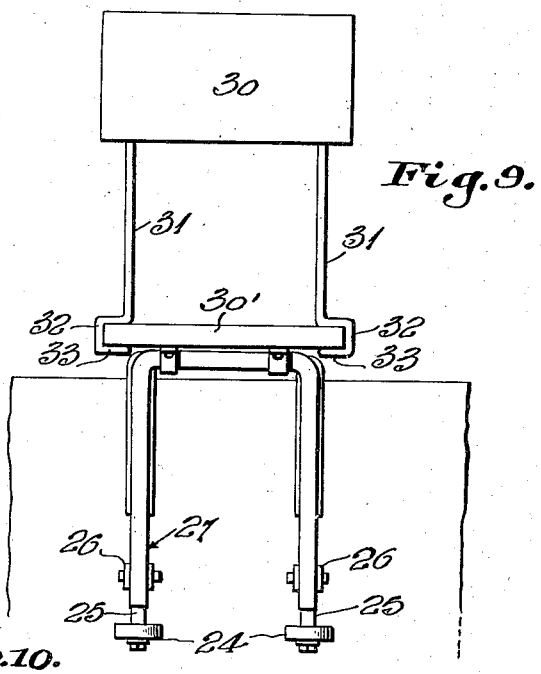
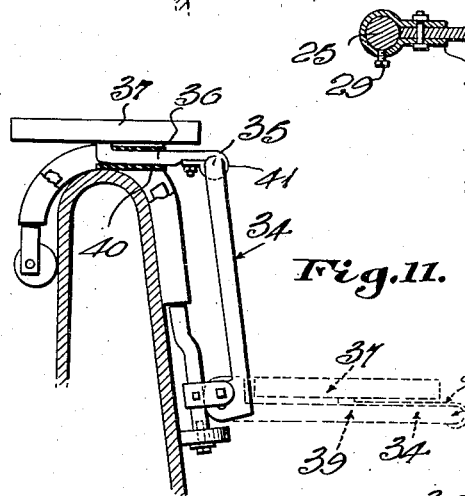
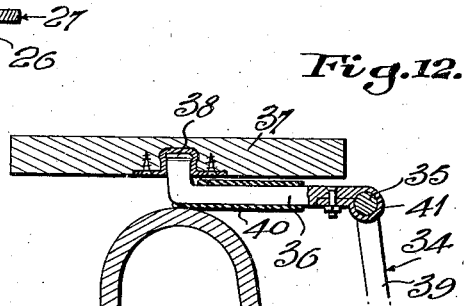
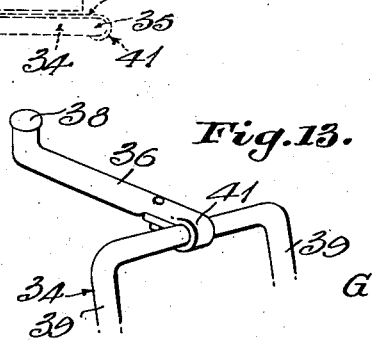
Inventor
G. Bentz
By H. B. Willson & Co.
Attorneys Jan. 3, 1939.　　　　G. B. BENTZ　　　　2,142,263
BATHTUB SEAT ATTACHMENT
Filed Aug. 12, 1937　　　　4 Sheets-Sheet 3
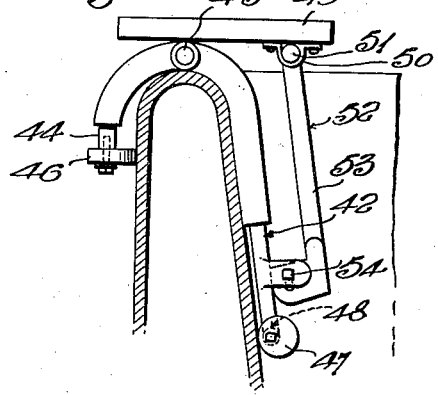
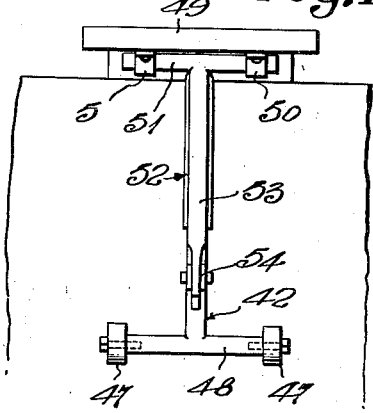
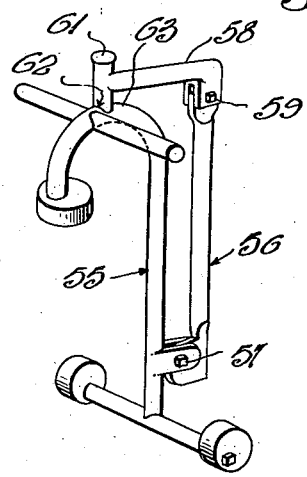
Inventor
G. B. Bentz Jan. 3, 1939. G. B. BENTZ 2,142,263
BATHTUB SEAT ATTACHMENT
Filed Aug. 12, 1937 4 Sheets-Sheet 4

Inventor
G. B. Bentz
By H. A. Wilson & Co.
Attorneys

Patented Jan. 3, 1939

2,142,263

UNITED STATES PATENT OFFICE 2,142,263

BATHTUB SEAT ATTACHMENT

George B. Bentz, New York, N. Y.

Application August 12, 1937, Serial No. 158,680

9 Claims. (Cl. 155—36.5)

The invention relates to a new and improved bathtub seat attachment of the general type having a hanger to hook over the rim of a tub.

One object of the invention is to make novel provision whereby the seat may be supported in a relatively low position at either the interior or the exterior of the tub, or may be supported at a relatively high position over the tub rim.

A further aim is to provide for adjustments of the seat hanger according to the width of the tub rim and the inclination of the tub wall.

Another object is to provide for revolubly mounting the seat, allowing said seat to aid in entering and leaving the tub when supported over the tub rim.

Yet another object is to provide a construction which permits compact folding of the attachment when not in use.

A still further object is to provide a novel back for the seat, attachable and detachable as desired.

Yet another object is to make novel provision for holding toilet articles in convenient reach of a person using the seat.

With the foregoing and minor objects in view, the invention resides in the novel subject matter hereinafter described and claimed, description being accomplished by reference to the accompanying drawings.

Fig. 1 is a side elevation partly broken away and in section showing one form of the invention connected with a bathtub, a portion of the latter being shown in transverse section, the seat being in its lowered position.

Fig. 2 is a view similar to Fig. 1 but showing the seat in its elevated position above the tub rim.

Fig. 3 is a view similar to Fig. 2 but showing the seat in its downwardly hanging out-of-the-way position.

Fig. 4 is an outer side elevation, the parts being related as shown in Fig. 2.

Fig. 5 is an inner side elevation, the parts being related as seen in Fig. 1.

Fig. 6 is a disassembled perspective view.

Fig. 7 is a detail vertical section showing the means for pivotally mounting the seat carrier and holding it in vertical position when desired.

Fig. 8 is a view similar to Fig. 1 but showing a different construction.

Fig. 9 is an inner side elevation of the construction shown in Fig. 8.

Fig. 10 is a detail horizontal section on line 10—10 of Fig. 8.

Fig. 11 is a view similar to Fig. 2 but illustrating a revolubly mounted seat.

Fig. 12 is a sectional view through the upper portion of the construction shown in Fig. 11.

Fig. 13 is a perspective view of the seat carrier and arm illustrated in Figs. 11 and 12.

Fig. 14 is a view similar to Fig. 2, but illustrating still another form of construction.

Fig. 15 is an inner side elevation of the construction shown in Fig. 14.

Fig. 16 is a perspective view of the hanger and the seat carrier shown in Figs. 14 and 15.

Fig. 17 is a view similar to Fig. 14 but showing yet another variation.

Fig. 18 is a perspective view showing the hanger, seat carrier and arm illustrated in Fig. 17.

Figure 19:
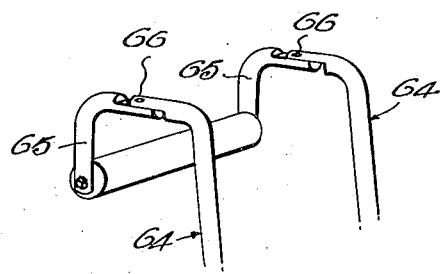
Fig. 19 is a perspective view showing adjustable hooks with which the hanger may be provided.

In the drawings above briefly described, several forms of construction have been illustrated and while they will all be specifically described, it is to be understood that variations may be made within the scope of the invention as claimed.

In Figs. 1 to 7, a hanger 1 is shown having two hooks 2 at its upper end to hook over the rim 3 of a bathtub 4, said hanger having two rod portions 5 projecting downwardly from said hooks 2 for disposition at the inner side of the tub wall when the seat is to be used for bathing, and for disposition at the outer side of said wall if the seat is to be used as a stool at the exterior of the tub. An elongated eccentric 6 extends between the lower ends of the hooks 2 and is frictionally mounted upon a rod 7, said eccentric being turnable to one position or another to abut the tub wall to firmly mount the hanger 1 regardless of the width of the tub rim.

The lower end of each rod portion 5 is provided with two lateral lugs 8 instrumental in pivoting a seat carrier 9 to said rod portions, said seat carrier being swingable from the horizontal position in Fig. 1 to the upstanding position of Fig. 2. A suitable seat 10 is pivotally connected with the outer end of the carrier 9 and rests upon this carrier when the latter is in the lowered horizontal position of Fig. 1. When the carrier 9 is swung to its upstanding position, the seat 10 may occupy a position over the hooks 2 and over the tub rim 3, as illustrated in Fig. 2, or when said carrier is in said upstanding position, the seat 10 may occupy the downwardly hanging out-of-the-way position illustrated in Fig. 3.

The carrier 9 is of U-shape and is provided with lugs 11 on the free ends of its arm 12, said lugs being received between the lateral lugs 8 of the rod portions 5. Each of the lugs 11 is provided with a slot 13 which is vertically positioned when the carrier 9 occupies its upstanding position, as seen in Fig. 7. A rivet, bolt or the like 14 passes through each slot 13 and is secured in openings in the adjacent lugs 8. Each slot 13 is so positioned with regard to the edge 15 of the lug in which it is formed, that said edge will abut the adjacent rod portion 5 and prevent downward swinging of the seat carrier 9, as seen in Fig. 7, until said seat carrier is lifted. When lifted sufficiently, the carrier 9 may swing downwardly, and the lug edges 16 then abut the rod portions 5 to prevent downward swinging of the carrier below its horizontal position, as will be clear from Fig. 1.

The seat 10 is connected with the arm-connecting portion 17 of the seat carrier 9, by appropriate bearing straps 18 which pass around said portion 17 and are secured by screws or the like to the lower side of said seat.

If desired, to assist in more rigidly holding the seat 10 in the position of Fig. 2, said seat may be provided with downwardly projecting studs 19 receivable in sockets 20 in the bight portions of the hooks 2, or any other appropriate means could be employed for connecting said seat with said bight portions.

The hooks 2 and the rod portions 5 are preferably provided with coverings 21 of rubber or the like, and the eccentric 6 may either be similarly covered or may be constructed from a material which will not injure the finish of the tub.

If desired, the hooks 2 may be as long as the rod portions 5, as shown, whereby said hooks and rod portions may rest upon the floor if desired when the seat 10 is supported as in Fig. 2, thereby providing a convenient stool.

In Figs. 8 to 10, the hanger 22 is very similar to the hanger 1. However, in addition to providing it with an eccentric 23 corresponding to the eccentric 6, it is provided with other eccentrics 24 on the lower ends of its rod portions 25. These eccentrics may be adjusted according to the inclination of the tub side wall so that the seat may be level regardless of the wall inclination. The lugs 26 of the hanger 22, to which the seat carrier 27 is pivoted, instead of being integral with the hanger as is the case with the lugs 8, are integral with collars 28 secured upon the rod portions 25 by set screws or the like 29.

In the figures just described, I have shown a detachable back 30 for the seat 30', but said back could also be used upon the seat 10 or upon any of the other seats hereinafter described. The back 30 is provided with two supporting rods 31 whose lower ends are bent into C-shape as illustrated at 32, to embrace opposite edges of the seat. The lower ends of the C-shaped formations 32 are bent laterally to provide fingers 33 which lie against the lower side of the seat and brace the back 30 against rearward tilting. The back may be attached and detached as desired.

In Figs. 11 to 13, the U-shaped seat carrier 34 corresponds to the carrier 9 above described. To the arm-connecting portion 35 of this carrier 34, an arm 36 is pivoted, said arm serving to pivotally connect the seat 37 with said carrier 34. The seat 37 is revolubly mounted at 38 upon the arm 36 and this aids in entering and leaving the tub when the seat is supported over the tub rim. A person either within or outside of the tube may readily sit upon the seat when in this position and by revolving the seat may so position his body that the legs may be swung over the tub wall either into or from the tub, as the case may be. When the carrier 34 occupies its lowered horizontal position, the arm 36 lies between the arms 39 of said carrier and the seat 37 rests upon these arms. As the arm 36 rests upon the tub rim when the carrier 34 occupies its raised position, said arm is preferably covered with rubber or the like as denoted at 40.

Any suitable pivotal connection may be provided between the arm 36 and the portion 35 of the carrier 34 but I prefer to provide said arm with a bearing such as 41, surrounding the center of said portion 35 and suitably held against sliding thereon.

In Figs. 14 to 16, an inverted T-shaped hanger 42 is employed, the upper end of the shank 43 of said hanger being curved downwardly to provide a hook 44 to engage the tub rim. This hook is preferably provided with rigid arms 45 projecting horizontally in opposite directions to lie upon the tub rim, holding the hanger against any swinging movement longitudinally of the tub. The free end of the hook 44 is provided with an eccentric 46 which may be turned according to the width of the tub rim, and other eccentrics 47 are mounted on the ends of the head portion 48 of the hanger 42 for use in leveling the seat 49, regardless of the inclination of the tub side wall. This seat is pivotally connected by appropriate bearings 50 with the head portion 51 of a T-shaped carrier 52, the shank 53 of said carrier being pivotally connected at 54 with the shank 43 of the hanger 42. The connection 54 may be similar to the connection above described between the carrier 9 and the hanger 1.

In Figs. 17 and 18, the hanger 55 is identical with the hanger 42. The carrier 56 however, is merely in the form of a rod suitably pivoted at 57 to said hanger 55, the pivotal connection being preferably the same as that used at 54. An arm 58 corresponding to the arm 36 is pivoted at 59 to the free end of the carrier 56, and the seat 60 is revolubly mounted upon said arm as shown at 61. The arm 58 is provided with an arched portion 62 which rests on the bight portion 63 of the hanger 55 when the arm 56 occupies its upstanding position, said arched portion 62 resting on said carrier 56 when the latter is horizontally positioned.

Figure 20:
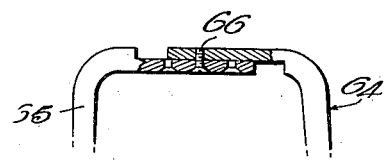
Fig. 20 is a detail sectional view through the adjustment of one of the hooks shown in Fig. 19.

In Figs. 19 and 20, a seat-supporting hanger 64 is shown, upon which a seat may be mounted in any of the ways above described or in any other appropriate way. The hooks 65 of this hanger are formed from suitable sections relatively adjustable by appropriate means 66, according to the width of the tub rim.

Figure 21:
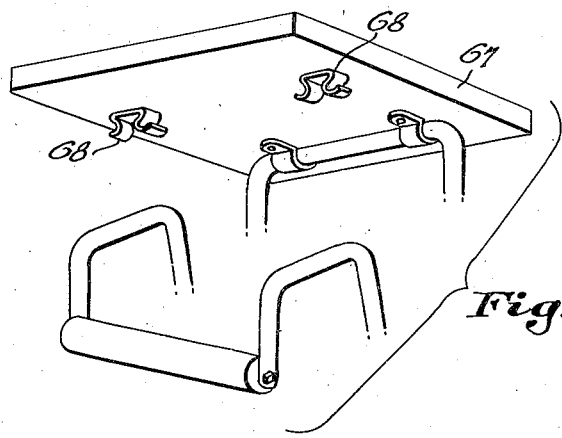
Fig. 21 is a perspective view showing the seat provided with clips to engage the hooks of the hanger when said seat is in a position over the tub rim and to engage the seat carrier when said seat is in its lowered position.

In Fig. 21, a seat 67 is shown having U-shaped clips 68 to engage the suspending hooks of a hanger such as the hanger 1, and the arms of a U-shaped carrier such as the carrier 9.

Figure 23:
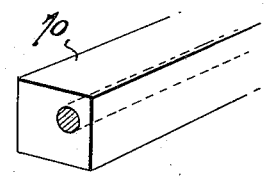
Figs. 22 and 23 are perspective views showing flat-sided eccentrics which may be used instead of cylindrical eccentrics shown in the preceding views.
Figure 22:
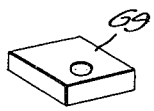

In Figs. 22 and 23, I show flat-sided eccentrics 69 and 70 which may be used instead of the cylindrical eccentrics shown in the preceding views, the flat sides of said eccentrics 69 and 70 serving to prevent them from having a tendency to turn out of adjustment.

Figure 24:
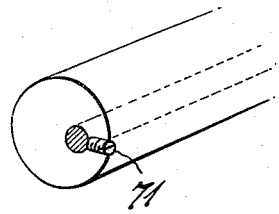
Fig. 24 is a perspective view illustrating a set screw which may be used to lock any of the cylindrical eccentrics in adjusted position.

If desired, any of the cylindrical eccentrics may be provided with a set screw such as 71 of Fig. 24 to hold it in adjusted position.

Figure 25:
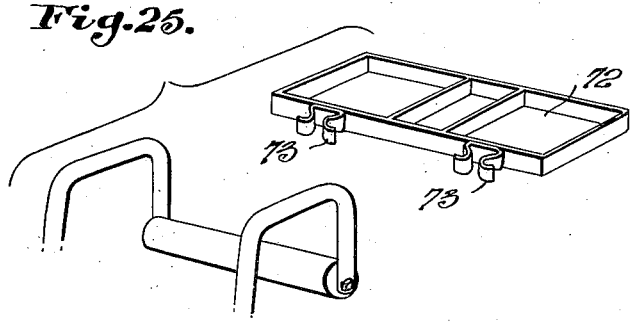
Fig. 25 is a perspective view illustrating a tray for toilet articles having clips for connecting it with the hanger.

In Fig. 25, I illustrate a tray 73 for toilet articles, said tray having U-shaped spring clips 74 for detachably securing it to a hanger such as the hanger 1, in convenient reach of a person using the seat.

From the foregoing taken in connection with the accompanying drawings, it will be seen that novel provision has been made for carrying out the objects of the invention, and while the details disclosed are preferable, numerous variations may be made within the scope of the invention as claimed, as above stated.

I claim:

1. A bathtub seat attachment comprising a hanger having a hook at its upper end to engage a tub rim, a seat carrier pivoted at one end to said hanger to swing from a horizontal position to an upstanding position, a seat pivoted to the other end of said seat carrier and lying upon said carrier when the latter is in said horizontal position, said seat being capable of extending laterally from the upper end of said carrier to a position over said hook when said carrier occupies said upstanding position, means for holding said carrier against depression from said horizontal position, and means for holding said carrier against accidental swinging from said upstanding position.

2. A bathtub seat attachment comprising a hanger having a hook at its upper end to engage a tub rim, a seat carrier pivoted at one end to said hanger to swing from a horizontal position to an upstanding position, a seat pivoted to the other end of said seat carrier and lying upon said carrier when the latter is in said horizontal position, said seat being capable of occupying a horizontal position over said hook when said carrier is in said upstanding position and being capable of occupying a vertically hanging position when said carrier is in said upstanding position, means for holding said carrier against depression from said horizontal position, and means for holding said carrier against accidental swinging from said upstanding position.

3. A structure as specified in claim 1, together with means on said seat to engage said hook when said seat occupies said position over said hook.

4. A bathtub seat attachment comprising a hanger having hooks at its upper end to engage a tub rim, said hanger having two vertical rod portions projecting downwardly from said hooks respectively, a U-shaped seat carrier having the free ends of its arms pivoted to the lower ends of said rod portions, whereby said carrier may swing from a horizontal position to an upstanding position, means for holding said carrier against descent from said horizontal position, means for holding said carrier against accidental swinging from said upstanding position, and a seat pivoted to the arm-connecting portion of said carrier to lie upon said arms of said carrier when the carrier occupies said horizontal position, said seat being swingable to a horizontal position over said hooks when said hanger occupies said upstanding position.

5. A bathtub seat attachment comprising a hanger having a hook at its upper end to engage a bathtub rim, a seat carrier pivoted at one end to said hanger to swing from a horizontal position to an upstanding position, an arm pivoted to the other end of said carrier to occupy a horizontal position over the tub rim when said carrier occupies said upstanding position, a seat revolubly connected with said arm to be revolubly supported thereby over the tub rim when said carrier occupies said upstanding position, said seat being supported by said carrier when the latter is in said horizontal position, means for holding said carrier against depression from said horizontal position, and means for holding said carrier against accidental movement from said upstanding position.

6. A bathtub seat attachment comprising an inverted T-shaped hanger having its upper end curved downwardly to provide a hook to engage the rim of a tub, a T-shaped seat carrier having its shank portion pivoted to the shank portion of said hanger to swing from a horizontal position to an upstanding position, a seat to lie upon said carrier when the latter occupies said horizontal position, said seat being pivoted to the head portion of said carrier and being swingable laterally therefrom to a position over the tub rim when said carrier occupies said upstanding position, means for holding said carrier against depression from said horizontal position, and means for holding said carrier against accidental swinging from said upstanding position.

7. A bathtub seat attachment comprising an inverted T-shaped hanger having its upper end curved downwardly to provide a hook to engage the rim of a tub, a seat carrier pivoted to said hanger to swing from a horizontal position to an upstanding position, an arm pivoted to said carrier to extend over the bight of said hook when said carrier occupies said upstanding position, said arm having a portion to rest on said bight when said carrier occupies said upstanding position and to rest on said carrier when the latter occupies said horizontal position, and a seat revolubly connected with said arm.

8. A bathtub seat attachment comprising a hanger having a hook at its upper end to engage a tub rim, a seat carrier pivoted at one of its ends to said hanger for movement from a lowered horizontal position to an upstanding position, a seat pivoted to the other end of said seat carrier and occupying a lowered horizontal position when said carrier occupies said lowered horizontal position, said seat being movable to a horizontal position over the tub rim when said seat carrier occupies said upstanding position, means for holding said seat carrier against depression from said lowered horizontal position, and means for holding said seat carrier against accidental swinging from said upstanding position.

9. A bathtub seat attachment comprising a hanger having a supporting hook at its upper end to engage a tub rim, a seat capable of movement from a lowered position within the tub to a raised position over the tub rim, and supporting means for said seat including a carrier pivoted to said seat and to said hanger and swingable vertically to guide said seat from either of said positions to the other, and means for limiting the downward movement of the pivotally connected seat and carrier.

GEORGE B. BENTZ.